United States Patent
Reed et al.

(10) Patent No.: US 6,707,627 B1
(45) Date of Patent: Mar. 16, 2004

(54) ERROR CHECKING IN A DISK DRIVE SYSTEM USING A MODULO CODE

(75) Inventors: David E. Reed, Westminster, CO (US); Lisa C. Sundell, Boulder, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/518,655

(22) Filed: Mar. 3, 2000

(51) Int. Cl.⁷ .................................................. G11B 5/09
(52) U.S. Cl. ......................................... 360/53; 360/39
(58) Field of Search ............................. 390/53, 39, 48, 390/46; 714/769, 770, 771; 341/94

(56) References Cited

U.S. PATENT DOCUMENTS

| | | | | |
|---|---|---|---|---|
| 5,428,627 A | * | 6/1995 | Gupta ......................... 714/771 |
| 5,726,818 A | | 3/1998 | Reed et al. |
| 5,737,142 A | | 4/1998 | Zook |
| 5,786,950 A | | 7/1998 | Zook et al. |
| 5,892,632 A | * | 4/1999 | Behrens et al. ............... 360/51 |
| 5,909,332 A | | 6/1999 | Spurbeck et al. |
| 5,917,668 A | | 6/1999 | Behrens et al. |
| 5,926,490 A | | 7/1999 | Reed et al. |
| 6,005,727 A | * | 12/1999 | Behrens et al. ................ 360/48 |
| 6,032,284 A | * | 2/2000 | Bliss ........................... 714/792 |
| 6,115,198 A | * | 9/2000 | Reed et al. .................... 360/46 |

* cited by examiner

Primary Examiner—David Hudspeth
Assistant Examiner—Varsha A. Kapadia

(57) ABSTRACT

A disk drive system is disclosed that includes a disk device coupled to control circuitry. The control circuitry encodes data using a modulo code. The control circuitry separates the data into blocks and encodes the data by inserting stuff bits between blocks according to the modulo code. The control circuitry converts the encoded data into a write signal and transfers the write signal to the disk device. The control circuitry also receives a read signal from the disk device and converts the read signal into a data signal. The data signal represents blocks of data separated by stuff bits. The control circuitry detects errors in a block of data by determining the modulo value of the block of data and the following stuff bits.

70 Claims, 6 Drawing Sheets

| BLOCK 1 LAST BIT | BLOCK 2 FIRST BIT | MOD-3 VALUE OF BLOCK ONE | NRZ STATE OF BLOCK ONE | STUFF BITS | | | |
|---|---|---|---|---|---|---|---|
| | | | | 1 | 2 | 3 | 4 |
| 511 | 521 | 600 | 610 | 531 | 532 | 533 | 534 |
| 0 | 0 | 0 | 0 | 0 | 1 | 0 | 0 |
| 0 | 0 | 1 | 0 | 0 | 0 | 1 | 0 |
| 0 | 0 | 2 | 0 | 0 | 0 | 0 | 1 |
| 0 | 0 | 0 | 1 | 0 | 0 | 0 | 1 |
| 0 | 0 | 1 | 1 | 0 | 0 | 1 | 0 |
| 0 | 0 | 2 | 1 | 0 | 1 | 0 | 0 |
| 0 | 1 | 0 | 0 | 0 | 1 | 0 | 0 |
| 0 | 1 | 1 | 0 | 0 | 0 | 1 | 0 |
| 0 | 1 | 2 | 0 | 1 | 0 | 0 | 0 |
| 0 | 1 | 0 | 1 | 1 | 0 | 0 | 0 |
| 0 | 1 | 1 | 1 | 0 | 0 | 1 | 0 |
| 0 | 1 | 2 | 1 | 0 | 1 | 0 | 0 |
| 1 | 0 | 0 | 0 | 0 | 1 | 0 | 0 |
| 1 | 0 | 1 | 0 | 0 | 0 | 1 | 0 |
| 1 | 0 | 2 | 0 | 0 | 0 | 0 | 1 |
| 1 | 0 | 0 | 1 | 0 | 0 | 0 | 1 |
| 1 | 0 | 1 | 1 | 0 | 0 | 1 | 0 |
| 1 | 0 | 2 | 1 | 0 | 1 | 0 | 0 |

| BLOCK 1 LAST BIT 211 | BLOCK 2 FIRST BIT 211 | STUFF BITS | |
|---|---|---|---|
| | | 1 231 | 2 232 |
| 0 | 0 | EITHER 0 OR 1 | EITHER 0 OR 1 |
| 1 | 0 | 0 | PARITY |
| 0 | 1 | PARITY | 0 |

FIG. 3
*PRIOR ART*

| BLOCK 1 LAST BIT 511 | BLOCK 2 FIRST BIT 521 | MOD-3 VALUE OF BLOCK ONE 600 | NRZ STATE OF BLOCK ONE 610 | STUFF BITS 1 531 | 2 532 | 3 533 | 4 534 |
|---|---|---|---|---|---|---|---|
| 0 | 0 | 0 | 0 | 0 | 1 | 0 | 0 |
| 0 | 0 | 1 | 0 | 0 | 0 | 1 | 0 |
| 0 | 0 | 2 | 0 | 0 | 0 | 0 | 1 |
| 0 | 0 | 0 | 1 | 0 | 0 | 0 | 1 |
| 0 | 0 | 1 | 1 | 0 | 0 | 1 | 0 |
| 0 | 0 | 2 | 1 | 0 | 1 | 0 | 0 |
| 0 | 1 | 0 | 0 | 0 | 1 | 0 | 0 |
| 0 | 1 | 1 | 0 | 0 | 0 | 1 | 0 |
| 0 | 1 | 2 | 0 | 1 | 0 | 0 | 0 |
| 0 | 1 | 0 | 1 | 1 | 0 | 0 | 0 |
| 0 | 1 | 1 | 1 | 0 | 0 | 1 | 0 |
| 0 | 1 | 2 | 1 | 0 | 1 | 0 | 0 |
| 1 | 0 | 0 | 0 | 0 | 1 | 0 | 0 |
| 1 | 0 | 1 | 0 | 0 | 0 | 1 | 0 |
| 1 | 0 | 2 | 0 | 0 | 0 | 0 | 1 |
| 1 | 0 | 0 | 1 | 0 | 0 | 0 | 1 |
| 1 | 0 | 1 | 1 | 0 | 0 | 1 | 0 |
| 1 | 0 | 2 | 1 | 0 | 1 | 0 | 0 |

*FIG. 6*

ERROR CHECKING IN A DISK DRIVE SYSTEM USING A MODULO CODE

BACKGROUND OF THE INVENTION

1. Field of the Invention

The invention is related to the field of disk drive systems, and in particular to disk drive systems and circuitry that encode and decode data using a modulo code for error checking.

2. Statement of the Problem

FIG. 1 shows a conventional disk drive system 100. The disk drive system 100 includes a disk device 102 connected to control circuitry 106. The disk device 102 includes storage media 104 that stores data. Some examples of the storage media 104 are magnetic and optical disks. The control circuitry 106 includes a read channel circuit 120 and a write channel circuit 140. The write channel circuit 140 transfers signals to the disk device 102 to store data. The read channel circuit 120 processes signals from the disk device 102 to reproduce the stored data. The write channel circuit 140 includes an encoder 142, a write compensation circuit 144, and an interface 146 all connected in series. The read channel circuit 120 includes a sampling circuit 122, an adaptive filter 124, an interpolated timing recovery (I.T.R.) circuit 126, a detector 128, and a decoder 130 all connected in series.

If the storage media 104 is a magnetic disk, then the data is exchanged with the magnetic disk as follows. The write channel circuit 140 generates a write signal 111 representing user data 141. The write signal 111 drives a magnetic head in the disk device 102. The magnetic head alters a magnetic field to create magnetic transitions on the magnetic disk. These magnetic transitions represent the data. The head subsequently detects the magnetic transitions to generate a read signal 110 that represents the magnetic transitions. The read channel circuit 120 processes the read signal 110 to produce a data signal 131 that represents the data.

If the storage media 104 is an optical disk, then the data is exchanged with the optical disk as follows. The write channel circuit 140 generates a write signal 111 representing the user data 141. The write signal 111 drives a device that creates pits in the surface of the optical disk. The pits create physical transitions that represent the data. An optical pick-up projects a laser onto the surface of the disk and detects the reflection to generate the read signal 110 that represents the physical transitions. The read channel circuit 120 processes the read signal 110 to produce the data signal 131 that represents the data.

To read or write the data, the magnetic head or optical pick-up must first be positioned over a certain track. To facilitate this positioning, servo information that identifies various locations on the disk is stored on the disk at the corresponding locations. The read signal 110 includes this servo information. The control circuitry 106 processes the servo information to control the positioning of the disk device 102.

The write channel circuit 140 operates as follows to store data on the disk device 102. The encoder 142 receives the user data 141. The encoder 142 encodes the user data 141 so that error-checking functions can be performed on the user data 141 when it is subsequently decoded. The encoder 142 transfers a digital signal 143 representing the encoded user data 141 to the write compensation circuit 144. The write compensation circuit 144 receives the digital signal 143 and adjusts the timing of the transitions in the digital signal 143. The write compensation circuit 144 transfers the digital signal 143 to the interface 146. The interface 146 receives the digital signal 143 and converts from digital to analog to form the write signal 111. The interface 146 transfers the write signal 111 to the disk device 102.

The read channel circuit 120 operates as follows to convert the read signal 110 into the data signal 131. The sampling circuit 122 converts the read signal 110 from analog to digital by sampling the read signal 110 to generate read samples 123 for the adaptive filter 124. The adaptive filter 124 removes distortion by shaping the read samples 123 to generate equalized samples 125 for the I.T.R. circuit 126. The J.T.R. circuit 126 synchronizes the equalized samples 125 with the detector 128 clock by interpolating the equalized samples 125 at the detector 128 clock pulses to generate interpolated samples 127. The detector 128 converts the interpolated samples 127 into an encoded bit stream 129 by processing the interpolated samples 127 with a detection algorithm, such as a Viterbi state machine. The decoder 130 decodes the encoded bit stream 129 into the data signal 131 by applying a decoding technique, such as PR4 with D=1 constraints. The decoder 130 also performs error-checking functions on the data signal 131.

FIG. 2 illustrates how the encoder 142 encodes the user data 141. The encoder 142 separates the user data 141 into blocks, including a first data block 210, and a second data block 220. The encoder 142 inserts first stuff bits 231–232 between the first data block 210 and the second data block 220. The first stuff bits 231–232 are stripped out when the user data 141 is later decoded.

FIG. 3 shows a logical table that illustrates how the encoder 142 determines the values to insert into the first stuff bits 231–232. The encoder 142 utilizes non-return to zero invertive (NRZI) transition encoding, meaning that the presence or absence of a transition in the data signifies a bit. The encoder 142 maintains a D=1 constraint when encoding, meaning that at least one zero is required between consecutive ones. The encoder 142 looks at the last bit 211 of the first data block 210 and the first bit 221 of the second data block 220 when determining the values to insert into the first stuff bits 231–232. When the last bit 211 is a "0" and the first bit 221 is a "0", the encoder 142 inserts a "0" or "1" for the first stuff bits 231–232 so as to maintain the D=1 constraint. When the last bit 211 is a "1" and the first bit 221 is a "0", the encoder 142 inserts a "0" for stuff bit 231. The encoder 142 inserts a parity value for stuff bit 232. The parity value is commonly the parity of either the even or odd NRZI bits of the first data block 210. Parity checking such as this is well known in the art. When the last bit 211 is a "0" and the first bit 221 is a "1", the encoder 142 inserts a parity value for stuff bit 231. The parity value is commonly the parity of either the even or odd NRZI bits of the first data block 210. The encoder 142 inserts a "0" for stuff bit 232.

The decoder 130 checks for errors in the encoded bit stream 129 by using a parity check. The encoded bit stream 129 represents a third data block and second stuff bits. The decoder 130 starts by checking the parity of the third data block. The parity check commonly takes place over the even or odd NRZI bits of the third data block. The decoder 130 detects errors by comparing the parity of the third data block with the parity value inserted in the second stuff bits. If the parity values are the same, then no error is detected. If the parity values are different, then an error is detected. The same parity check takes place over all data blocks.

The problem with the current disk drive system 100 is that it provides insufficient error detection. The current detector 128 commonly produces bit shift errors in the process of converting the read signal 110 into the data signal 131. The error-checking method in the prior art often does not detect the bit-shift errors and fails to detect other types of errors. Reliability of the disk drive system 100 needs to be improved.

SUMMARY OF THE SOLUTION

The invention solves the above problem by providing error detection using a modulo code. The modulo code allows the disk drive system to detect bit shifts and other errors that may not be detected by the prior systems. The improved error detection makes for a more reliable disk drive system.

The disk drive system includes a disk device coupled to control circuitry. The control circuitry encodes data using a modulo code. The control circuitry separates the data into blocks and encodes the data by inserting stuff bits between blocks according to the modulo code. The control circuitry converts the encoded data into a write signal and transfers the write signal to the disk device. The control circuitry also receives a read signal from the disk device and converts the read signal into a data signal. The data signal represents blocks of data separated by stuff bits. The control circuitry detects errors in a block of data by determining the modulo value of the block of data and the following stuff bits.

DESCRIPTION OF THE DRAWINGS

FIG. 3 is a table of values used in an encoding method in the prior art.

FIG. 6 is a table of values used in a modulo encoding method in an example of the invention.

DETAILED DESCRIPTION OF THE INVENTION

Figure 1:
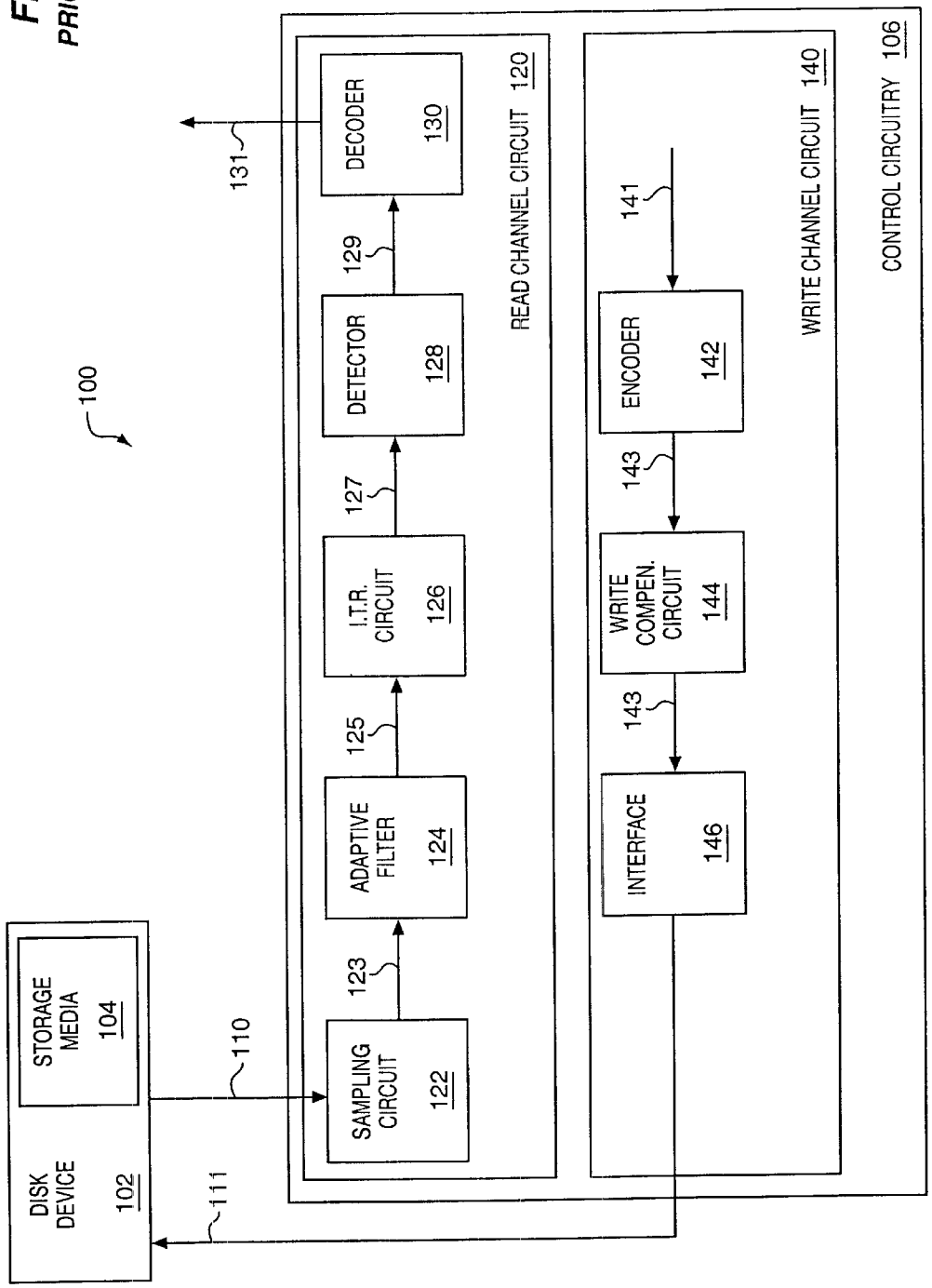
FIG. 1 is a block diagram that depicts a disk drive system in the prior art.
Figure 2:
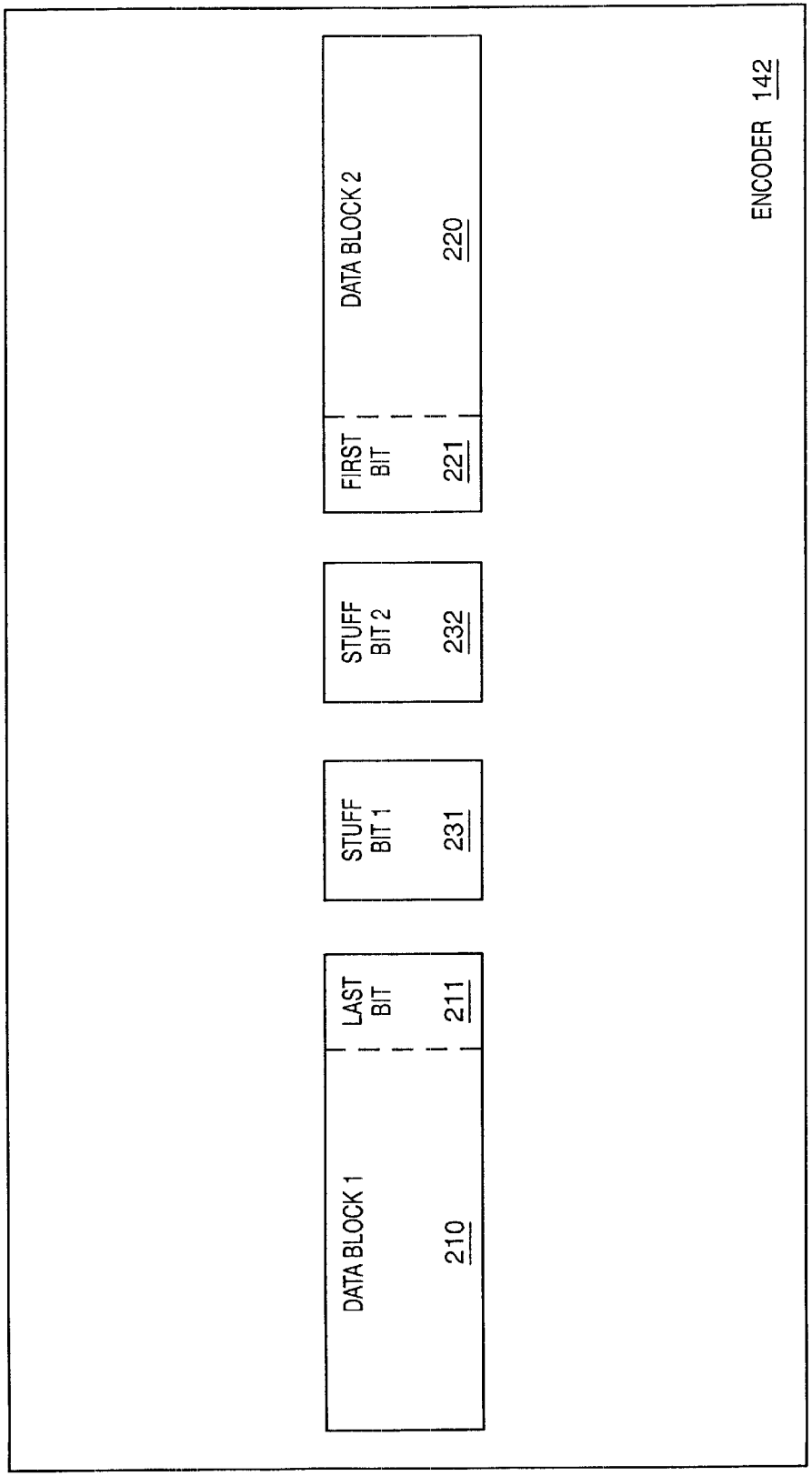
FIG. 2 is a block diagram that illustrates data-level encoding within an encoder in the prior art.
Figure 4:
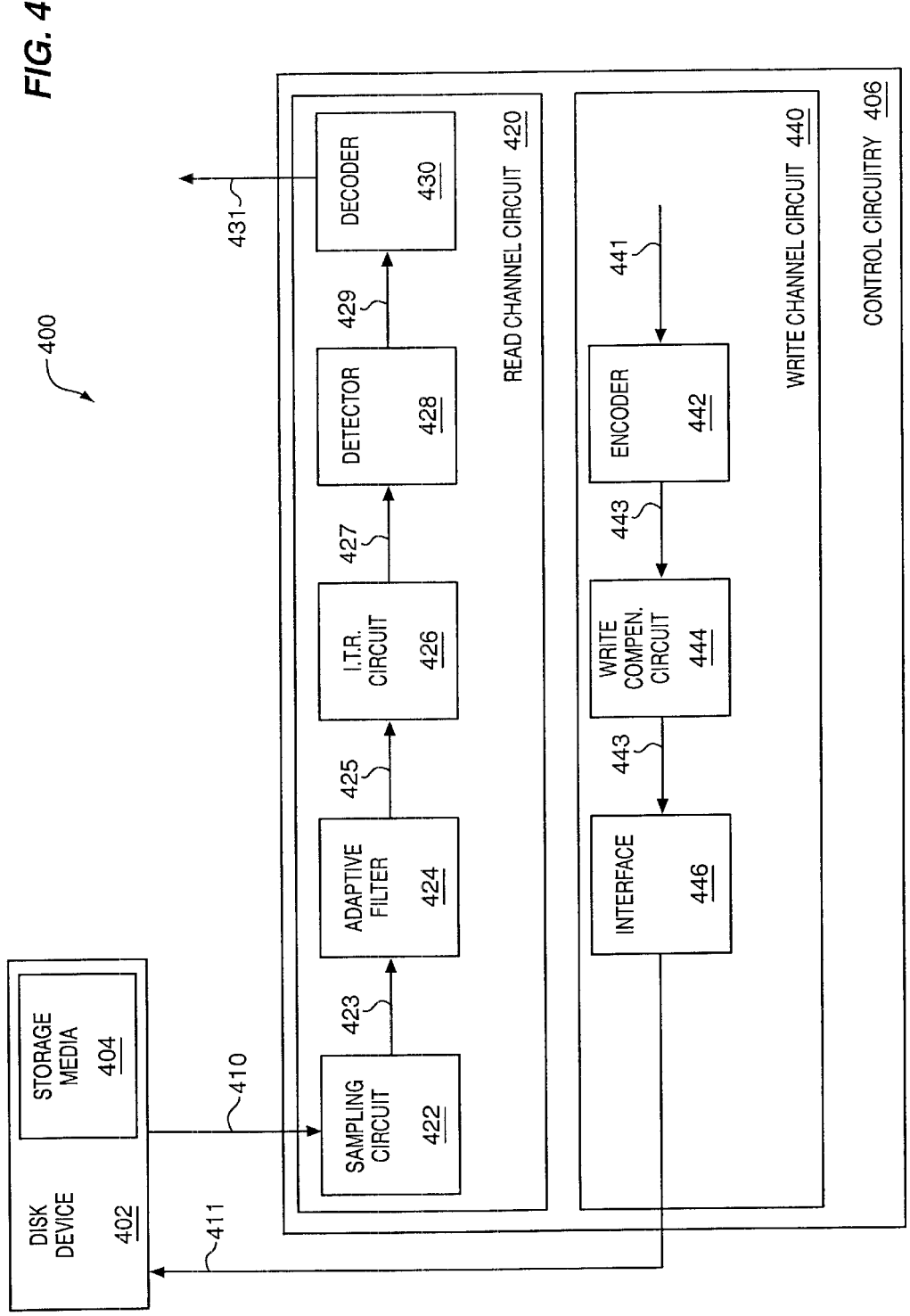
FIG. 4 is a block diagram that depicts a disk drive system in an example of the invention.
Figure 5:
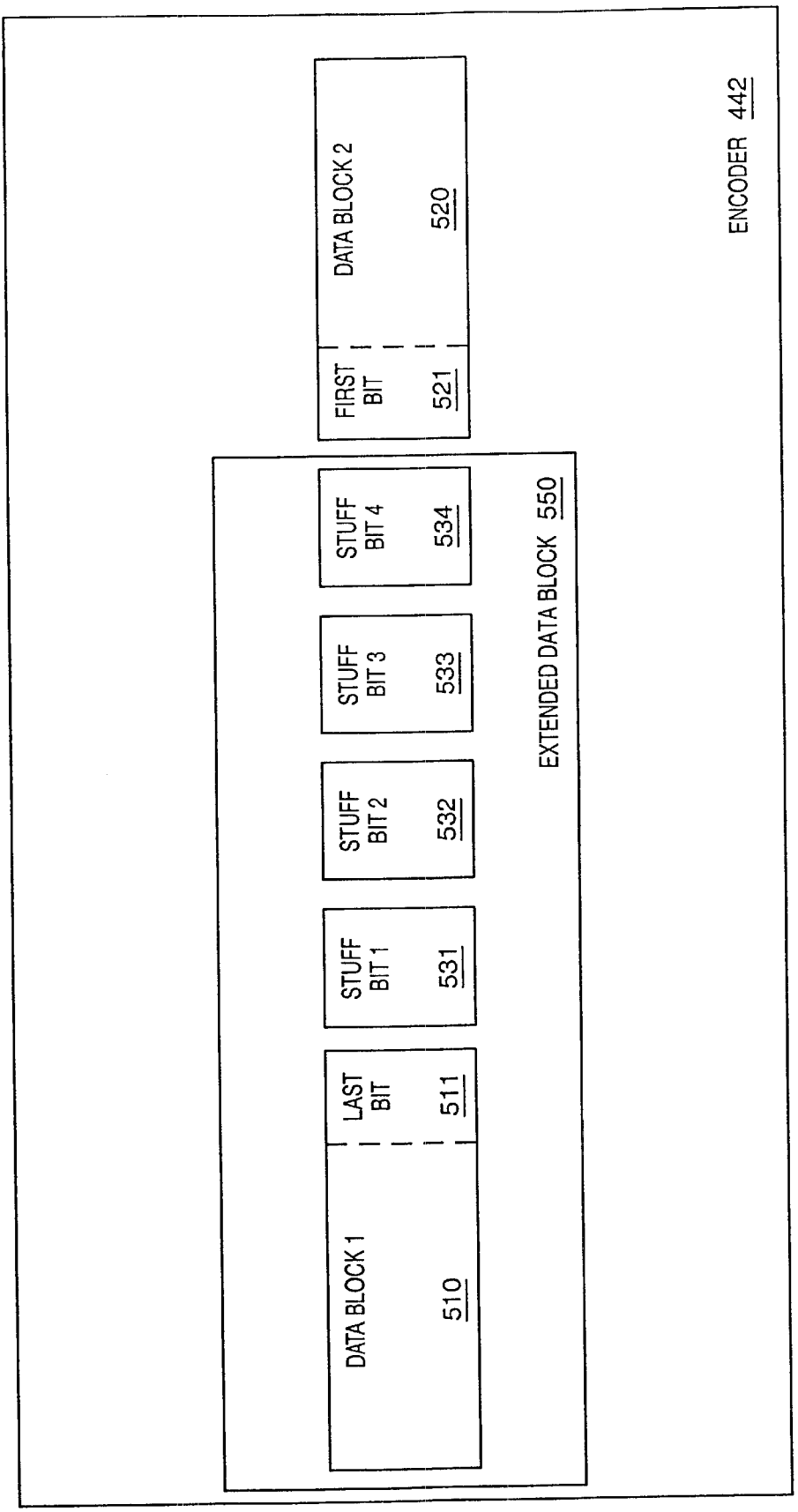
FIG. 5 is a block diagram that illustrates data-level encoding within an encoder in an example of the invention.

Disk Drive System Configuration and Operation—
FIGS. 4–6

FIG. 4 depicts a specific example of disk drive system 400 in accord with the present invention. Those skilled in the art will appreciate numerous variations from this example that do not depart from the scope of the invention. Those skilled in the art will also appreciate that various features could be combined to form multiple variations of the invention.

FIG. 4 shows the disk drive system 400. The disk drive system 400 includes a disk device 402 connected to control circuitry 406. The disk device 402 includes storage media 404 that stores data. The control circuitry 406 includes a read channel circuit 420 and a write channel circuit 440. The write channel circuit 440 transfers signals to the disk device 402 to store data. The read channel circuit 420 processes signals from the disk device 402 to reproduce the stored data. The write channel circuit 440 includes an encoder 442, a write compensation circuit 444, and an interface 446 all connected in series. The read channel circuit 420 includes a sampling circuit 422, an adaptive filter 424, an interpolated timing recovery (I.T.R.) circuit 426, a detector 428, and a decoder 430 all connected in series.

The write channel circuit 440 operates as follows to store data on the disk device 402. The encoder 442 receives user data 441. The encoder 442 encodes the user data 441 so that error-checking functions can be performed on the user data 441 when it is subsequently decoded. The encoder 442 transfers a digital signal 443 representing the encoded user data 441 to the write compensation circuit 444. The write compensation circuit 444 receives the digital signal 443 and adjusts the timing of the transitions in the digital signal 443. The write compensation circuit 444 transfers the digital signal 443 to the interface 446. The interface 446 receives the digital signal 443 and converts from digital to analog to form the write signal 411. The interface 446 transfers the write signal 411 to the disk device 402.

The read channel circuit 420 operates as follows to convert the read signal 410 into the data signal 431. The sampling circuit 422 converts the read signal 410 from analog to digital by sampling the read signal 410 to generate read samples 423 for the adaptive filter 424. The adaptive filter 424 removes distortion by shaping the read samples 423 to generate equalized samples 425 for the I.T.R. circuit 426. The I.T.R. circuit 426 synchronizes the equalized samples 425 with the detector 428 clock by interpolating the equalized samples 425 at the detector 428 clock pulses to generate interpolated samples 427. The detector 428 converts the interpolated samples 427 into an encoded bit stream 429 by processing the interpolated samples 427 with a detection algorithm. The decoder 430 decodes the encoded bit stream 429 into the data signal 431 by applying a decoding technique. The decoder 430 also performs error-checking functions on the data signal 431.

The disk drive system 400 is a significant advance in the art because it encodes and decodes using a modulo code. The modulo code provides an improved error checking method. Thus, the modulo code is an advantage because the disk drive system 400,can more reliably detect errors.

FIG. 5 illustrates how the encoder 442 encodes the user data 441. The encoder 442 separates the user data 441 into blocks, including a first data block 510 and a second data block 520. The encoder 442 inserts first stuff bits 531–534 between the first data block 510 and the second data block 520. The first data block 510 and the first stuff bits 531–534 form a first extended data block 550. The first stuff bits 531–534 are one bit binary values inserted into the user data 441. The first stuff bits 531–534 are dummy bits that are stripped out when the user data 441 is subsequently decoded.

FIG. 6 shows a logical table that illustrates how the encoder 442 determines the values to insert into the first stuff bits 531–534. The encoder 442 utilizes non-return to zero invertive (NRZI) transition encoding, meaning that the presence or absence of a transition in the data signifies a bit. The encoder 442 maintains a D=1 constraint when encoding, meaning that at least one zero is required between consecutive ones.

The encoder 442 looks to four variables 511, 521, 600 and 610 when determining the values to insert into the first stuff bits 531–534. For the;first variable, the encoder 442 looks at the last bit 511 of the first data block 510. For the second variable, the encoder 442 looks at the first bit 521 of the second data block 520. For the third variable, the encoder 442 determines the modulo-3 value 600 of the first data block 510. The method to determine the modulo-3 value of the first data block 510 is conventional and well known in the art. The modulo-3 value will be either a "0", "1", or "2". For the fourth variable, the encoder 442 determines non-return to zero (NRZ) state 610 at the end of the first data block 510. NRZI transition encoding is conventional and the method to determine the NRZ state is well known in the art. The NRZ state will be either a "0" or "1".

The encoder 442 inserts the corresponding values into the first stuff bits 531–534 to give a constant modulo-3 value to the first extended data block 550. For example, the encoder 442 could, encode so that the first extended data block 550 has a modulo-3 value of zero. The table in FIG. 6 provides the modulo-3 code needed give the first extended data block 550 a modulo-3 value of zero.

The decoder 430 check for errors in the data signal 431 using the modulo-3 code. The data signal 431 represents a second extended data block comprised of a third data block and second stuff bits. The decoder 430 starts by determining the modulo value of the second extended data block. If the second extended data block has a modulo-3 value of "0", the decoder 430 doesn't detect an error in the third data block because it was encoded to have a modulo-3 value of "0". If the second extended data block has a modulo-3 value of "1" or "2", the decoder 430 detects an error in the third data block. The same error-checking method is used on all data blocks. Those skilled in the art will appreciate that the decoder 430 is not limited to the error checking method described above, and various other methods can be implemented.

The method of encoding and decoding using a modulo code is a significant advance in the art because it provides improved error checking. The error-checking method is an advantage over the prior art because it can detect bit shift errors that the prior art could not. The modulo code method makes the disk drive system more reliable.

Those skilled in the art will appreciate variations of the above-described embodiments that fall within the scope of the invention. As a result, the invention is not limited to the specific examples and illustrations discussed above, but only by the following claims and their equivalents.

We claim:

1. A disk drive system comprising:
    a disk device configured to receive a write signal and store corresponding data to a storage media, and to read the storage media and transfer a corresponding read signal; and
    control circuitry configured to receive a first data block and a second data block, insert first stuff bits between the first data block and the second data block to give a first modulo value to a first extended data block comprised of the first data block and the first stuff bits, convert the first extended data block into the write signal, transfer the write signal, receive the read signal, convert the read signal into a data signal representing a second extended data block comprised of a third data block and second stuff bits, and detect errors in the third data block by determining a second modulo value of the second extended data block.

2. The disk drive system in claim 1 wherein the modulo- values are modulo-three values.

3. The disk drive system in claim 2 wherein the modulo-three values equal zero.

4. The disk drive system in claim 1 wherein the control circuitry is further configured to preserve a D=1 constraint.

5. The disk drive system in claim 1 wherein the control circuitry is further configured to use non-return to zero invertive (NRZI) transition encoding.

6. The disk drive system in claim 1 wherein the control circuitry is further configured to change the timing of the transitions in a digital signal representing the first extended data block.

7. The disk drive system in claim 1 wherein the control circuitry is further configured to sample the read signal to generate read samples.

8. The disk drive system in claim 7 wherein the control circuitry is further configured to adaptively filter the read samples to generate equalized samples.

9. The disk drive system in claim 8 wherein the control circuitry is further configured to interpolate the equalized samples to generate interpolated samples.

10. The disk drive system in claim 9 wherein the control circuitry is further configured to detect an encoded bit stream in the interpolated samples.

11. The disk drive system in claim 10 wherein the control circuitry is further configured to decode the encoded bit stream into the data signal.

12. Disk drive control circuitry comprising:
    a write channel circuit configured to receive a first data block and a second data block, insert first stuff bits between the first data block and the second data block to give a first modulo value to a first extended data block comprised of the first data block and the first stuff bits, convert the first extended data block into a write signal, and transfer the write signal; and
    a read channel circuit configured to receive a read signal, convert the read signal into a data signal representing a second extended data block comprised of a third data block and second stuff bits, and detect errors in the third data block by determining a second modulo value of the second extended data block.

13. The disk drive control circuitry in claim 12 wherein the modulo values are modulo-three values.

14. The disk drive control circuitry in claim 13 wherein the modulo-three values equal zero.

15. The disk drive control circuitry in claim 12 wherein the write channel circuit is further configured to preserve a D=1 constraint.

16. The disk drive control circuitry in claim 12 wherein the write channel circuit is further configured to use non-return to zero invertive (NRZI) transition encoding.

17. The disk drive control circuitry in claim 12 wherein the write channel circuit is further configured to change the timing of the transitions in a digital signal representing the first extended data block.

18. The disk drive control circuitry in claim 12 wherein the read channel circuit is further configured to sample the read signal to generate read samples.

19. The disk drive control circuitry in claim 18 wherein the read channel circuit is further configured to adaptively filter the read samples to generate equalized samples.

20. The disk drive control circuitry in claim 19 wherein the read channel circuit is further configured to interpolate the equalized samples to generate interpolated samples.

21. The disk drive control circuitry in claim 20 wherein the read channel circuit is further configured to detect an encoded bit stream in the interpolated samples.

22. The disk drive control circuitry in claim 21 wherein the read channel circuit is further configured to decode the encoded bit stream into the data signal.

23. A write channel circuit comprising:
    an encoder configured to receive a first data block and a second data block, insert stuff bits between the first data block and the second data block to give a set modulo value to an extended data block comprised of the first data block and the stuff bits, and transfer the extended data block on a digital signal;
    a write compensation circuit configured to receive the digital signal, change the timing of the transitions in the digital signal, and transfer the digital signal; and an interface configured to receive the digital signal, convert the digital signal into an analog write signal, and transfer the write signal.

24. The write channel circuit in claim 23 wherein the modulo value is a modulo-three value.

25. The write channel circuit in claim 24 wherein the modulo-three value equals zero.

26. The write channel circuit in claim 23 wherein the encoder is further configured to preserve a D=1 constraint.

27. The write channel circuit in claim 23 wherein the encoder is further configured to use non-return to zero invertive (NRZI) transition encoding.

28. A read channel circuit comprising:
   a sampling circuit configured to receive and sample a read signal to generate read samples;
   an adaptive filter configured to receive and shape the read samples to generate equalized samples;
   an interpolated timing recovery (I.T.R.) circuit configured to receive and interpolate the equalized samples to generate interpolated samples;
   a detector configured to receive the interpolated samples and detect an encoded bit stream in the interpolated samples; and
   a decoder configured to receive the encoded bit stream, decode the encoded bit stream into a data signal representing an extended data block comprised of a first data block and stuff bits, and detect errors in the first data block by determining a modulo value of the extended data block.

29. The read channel circuit in claim 28 wherein the modulo value is a modulo-three value.

30. The read channel circuit in claim 29 wherein the modulo-three value equals zero.

31. A method for operating a disk drive system, the method comprising:
   inserting first stuff bits between a first data block and a second data block to give a first modulo value to a first extended data block comprised of the first data block and the first stuff bits;
   transferring a write signal representing the first extended data block;
   transferring a read signal representing a second extended data block comprised of a third data block and second stuff bits; and
   detecting errors in the third data block by determining a second modulo value of the second extended data block.

32. The method in claim 31 wherein the modulo values are modulo-three values.

33. The method in claim 32 wherein the modulo-three values equal zero.

34. The method in claim 31 further including preserving a D=1 constraint.

35. The method in claim 31 further including using non-return to zero invertive (NRZI) transition encoding.

36. The method in claim 31 further including changing the timing of the transitions in a digital signal representing the first extended data block.

37. The method in claim 31 further including converting the first extended data block into the write signal.

38. The method in claim 31 further including sampling the read signal to generate read samples.

39. The method in claim 38 further including adaptively filtering the read samples to generate equalized samples.

40. The method in claim 39 further including interpolating the equalized samples to generate interpolated samples.

41. The method in claim 40 further including detecting an encoded bit stream in the interpolated samples.

42. The method in claim 41 further including decoding the encoded bit stream into a data signal representing the second extended data block.

43. A method for operating disk drive control circuitry, the method comprising:
   inserting first stuff bits between a first data block and a second data block to give a first modulo value to a first extended data block comprised of the first data block and the first stuff bits;
   transferring a write signal representing the first extended data block;
   receiving a read signal representing a second extended data block comprised of a third data block and second stuff bits; and
   detecting errors in the third data block by determining a second modulo value of the second extended data block.

44. The method in claim 43 wherein the modulo values are modulo-three values.

45. The method in claim 43 wherein the modulo-three values equal zero.

46. The method in claim 43 further including preserving a D=1 constraint.

47. The method in claim 43 further including using non-return to zero invertive (NRZI) transition encoding.

48. The method in claim 43 further including changing the timing of the transitions in a digital signal representing the first extended data block.

49. The method in claim 43 further including converting the first extended data block into the write signal.

50. The method in claim 43 further including sampling the read signal to generate read samples.

51. The method in claim 50 further including adaptively filtering the read samples to generate equalized samples.

52. The method in claim 51 further including interpolating the equalized samples to generate interpolated samples.

53. The method in claim 52 further including detecting an encoded bit stream in the interpolated samples.

54. The method in claim 53 further including decoding the encoded bit stream into a data signal representing the second extended data block.

55. A method for operating a write channel circuit, the method comprising:
   receiving a first data block and a second data block;
   inserting stuff bits between the first data block and the second data block to give a set modulo value to an extended data block comprised of the first data block and the stuff bits;
   converting the extended data block into a write signal; and
   transferring the write signal.

56. The method in claim 55 wherein the modulo value is a modulo-three value.

57. The method in claim 55 wherein the modulo-three value equals zero.

58. The method in claim 55 further including preserving a D=1 constraint.

59. The method in claim 55 further including using non-return to zero invertive (NRZI) transition encoding.

60. The method in claim 55 further including changing the timing of the transitions in a digital signal representing the extended data block.

61. A method for operating a read channel circuit, the method comprising:
   receiving a read signal representing an extended data block comprised of a first data block and stuff bits;

converting the read signal into a data signal representing the extended data block; and detecting errors in first data block by determining a modulo value, of the extended data block.

62. The method in claim 61 wherein the modulo value is a modulo-three value.

63. The method in claim 61 wherein the modulo-three value equals zero.

64. The method in claim 61 further including preserving a D=1 constraint.

65. The method in claim 61 further including using non-return to zero invertive (NRZI) transition encoding.

66. The method in claim 61 further including sampling the read signal to generate read samples.

67. The method in claim 66 further including adaptively filtering the read samples to generate equalized samples.

68. The method in claim 67 further including interpolating the equalized samples to generate interpolated samples.

69. The method in claim 68 further including detecting an encoded bit stream in the interpolated samples.

70. The method in claim 69 further including decoding the encoded bit stream into the data signal.

* * * * *

UNITED STATES PATENT AND TRADEMARK OFFICE
CERTIFICATE OF CORRECTION

PATENT NO.   : 6,707,627 B1
DATED        : March 16, 2004
INVENTOR(S)  : David E. Reed and Lisa C. Sundell It is certified that error appears in the above-identified patent and that said Letters Patent is hereby corrected as shown below:

Column 2,
Line 14, replace "J.T.R." with -- I.T.R. --

Column 4,
Line 58, replace "For the; first" with -- For the first --

Column 5,
Line 7, "could, encode" with -- could encode --

Column 9,
Line 4, replace "value, of" with -- value of --

Signed and Sealed this

Eighth Day of June, 2004

JON W. DUDAS
*Acting Director of the United States Patent and Trademark Office*